(12) United States Patent
Kondo

(10) Patent No.: US 8,181,909 B2
(45) Date of Patent: May 22, 2012

(54) PRESSURE BULKHEAD FOR AIRCRAFT

(75) Inventor: Junichi Kondo, Greensboro, NC (US)

(73) Assignee: Honda Motor Co., Ltd., Tokyo (JP)

( * ) Notice: Subject to any disclaimer, the term of this patent is extended or adjusted under 35 U.S.C. 154(b) by 444 days.

(21) Appl. No.: 12/415,073

(22) Filed: Mar. 31, 2009

(65) Prior Publication Data

US 2009/0242701 A1 Oct. 1, 2009

Related U.S. Application Data

(60) Provisional application No. 61/040,882, filed on Mar. 31, 2008.

(51) Int. Cl.
*B64C 1/10* (2006.01)

(52) U.S. Cl. .......................... 244/119; 244/131

(58) Field of Classification Search .................. 244/119, 244/121, 120, 131; 52/655.1, 665; 403/205, 403/217, 218, 341
See application file for complete search history.

(56) References Cited

U.S. PATENT DOCUMENTS

| | | | |
|---|---|---|---|
| 5,981,023 A | 11/1999 | Tozuka et al. | |
| 6,213,426 B1 | 4/2001 | Weber et al. | |
| 6,378,805 B1 * | 4/2002 | Stephan et al. | 244/119 |
| 6,478,254 B2 * | 11/2002 | Matsui et al. | 244/119 |
| 6,684,593 B2 * | 2/2004 | Brenneis et al. | 52/630 |
| 7,766,277 B2 * | 8/2010 | Anderson et al. | 244/121 |
| 7,810,756 B2 * | 10/2010 | Alby et al. | 244/119 |
| 2001/0035118 A1 * | 11/2001 | Matsui et al. | 114/78 |
| 2006/0237588 A1 * | 10/2006 | Kismarton | 244/119 |
| 2008/0072527 A1 * | 3/2008 | Kondo et al. | 52/729.1 |
| 2009/0242701 A1 * | 10/2009 | Kondo | 244/121 |

FOREIGN PATENT DOCUMENTS

| | | |
|---|---|---|
| EP | 1533226 | 5/2005 |
| EP | 1533226 A1 * | 5/2005 |

* cited by examiner

*Primary Examiner* — Robert Canfield
*Assistant Examiner* — Jody Giacoman
(74) *Attorney, Agent, or Firm* — Rankin Hill & Clark LLP

(57) ABSTRACT

A pressure bulkhead assembly adapted for installation in an aircraft fuselage includes a bulkhead web and a reinforcing structure. The bulkhead web has a first side facing the pressurized compartment and a second side opposite the first side. The reinforcing structure, which is formed from a series of primary beam members, secondary beam members, and connecting elements, is provided on the second side of the bulkhead web.

14 Claims, 4 Drawing Sheets

PRESSURE BULKHEAD FOR AIRCRAFT

This application claims priority to U.S. provisional application Ser. No. 61/040,882 filed Mar. 31, 2008 of the same title, the contents of which are incorporated herein by reference in entirety.

FIELD OF THE INVENTION

The present invention relates to airframe construction for aircraft and, more particularly, to a pressure bulkhead for an aircraft.

BACKGROUND

The structural design of small aircraft, such as those used in business aviation, differs substantially from that of large commercial aircraft. These relatively small aircraft might be designed to carry from four to six passengers (in addition to the air crew). Of particular importance are the requirements of minimal weight and maximum cabin space. To meet these requirements, the fuselage is preferably constructed of fiber-reinforced composite materials.

When aircraft need to fly at altitudes of more than 25,000 ft., cockpit and cabin compartment must be pressurized. To accomplish this, the pressurized compartments normally have forward and aft bulkheads that separate the pressurized compartment from non-pressurized spaces. The bulkheads must have sufficient strength and rigidity to resist the pressure differential load at altitude.

The shape of a fuselage is generally tubular with a cross section that may be circular or oval, for example. The pressurized compartment is sealed in part by the inner surface of the fuselage and also in part by the pressure bulkhead mounted within the fuselage. The method used to install the pressure bulkhead in the fuselage must be effective to seal against air leakage and to assure maximum strength.

When the cockpit and cabin compartment of the aircraft is pressurized, the pressure force tends to deform the bulkhead outwardly and as a result, the bulkhead must be reinforced to provide adequate strength and stiffness to resist the force. In addition, in order to maximize the usable space in the cabin compartment, the height of the bulkhead assembly should be minimized. In this regard, bulkhead assembly height is the physical dimension of the bulkhead assembly extending from the pressurized compartment to the non-pressurized compartment, and for the aft bulkhead, generally extends in the forward-to-aft direction. The height of the aft bulkhead is especially important in the case of small aircraft wherein cabin space is at a premium.

In most cases, pressure bulkheads for small airplanes consist of a flat web and multiple beams. The flat web has a first surface facing toward the inside of the pressurized compartment and a second, opposite surface facing toward the non-pressurized compartment. The multiple beams, which serve as a reinforcing structure, are attached to the second surface of the flat web. In prior pressure bulkhead designs, sufficient strength has been provided at excessive height of the bulkhead assembly and has resulted in smaller pressurized compartments.

Therefore, there exists a need in the art for an improved design of a pressure bulkhead assembly that provides an assembly with a suitable strength at a reduced height.

SUMMARY

The present invention is directed toward an improved design for a pressure bulkhead assembly that has a reduced height dimension and thereby helps to maximize the space available for use as the pressurized compartment in an aircraft.

In accordance with the present invention there is provided an improved pressure bulkhead assembly adapted to be attached to the fuselage of a small aircraft having a pressurized compartment. An inner surface of the bulkhead assembly defines a part of the pressurized compartment.

In further accordance with the present invention, the bulkhead assembly includes a relatively flat plate or bulkhead web corresponding in shape and size to the cross section of the fuselage, and a relatively low height, grid-shaped reinforcing structure attached to the bulkhead web.

The bulkhead web has a first side facing toward the pressurized compartment, and a second side opposite the first side. The bulkhead web further defines a peripheral rim that is connected to the fuselage.

The reinforcing structure is attached to the second side of the bulkhead web, and includes a series of primary beam members, secondary beam members, and a plurality of connecting strips. Each of the beam members has a beam web interconnecting first and second flanges. The primary beam members are relatively elongated and have first and second ends that are each attached to the fuselage skin. The primary beam members may be arranged parallel to one another and might be uniformly spaced across the second surface of the bulkhead web, with the primary beam member first flange engaging the bulkhead web second surface.

The secondary beam members are discontinuous and include one or more inner beam members and a plurality of outer beam members that are generally aligned with one another. The inner secondary beam members are connected to, and extend between, adjacent primary beam members. The outer secondary beam members are connected to, and extend between, the fuselage skin and one of the primary beam members. The secondary beam member first flanges are generally co-planar with the primary beam member first flanges and engage the second side of the bulkhead web.

The connecting strips are attached to exposed surfaces of the second flanges of the secondary beam members, and extend across the intersection with the primary beam members. As such, the connecting strips interconnect inner and outer beam members of one of the secondary beam members, and serve as a supplemental flange structure to help strengthen the secondary beam members.

BRIEF DESCRIPTION OF THE DRAWINGS

These and further features of the invention will be apparent with reference to the following description and drawings, wherein.

DETAILED DESCRIPTION

Figure 1A:
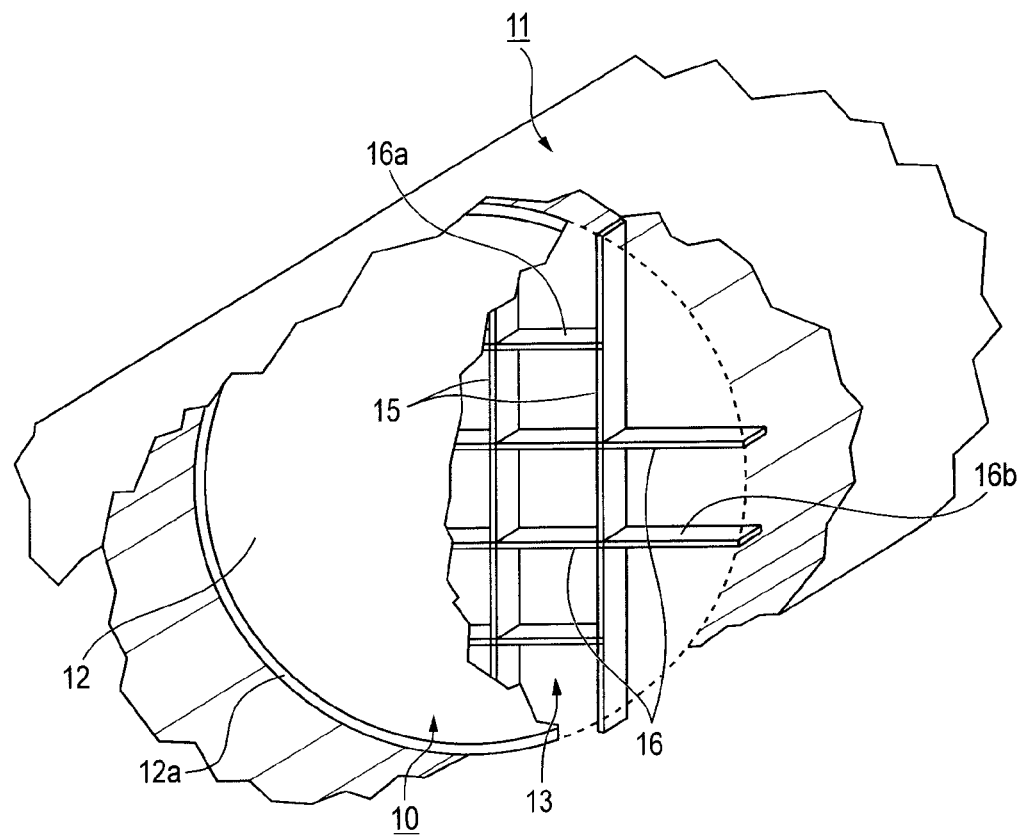
FIG. 1A is a fragmentary perspective view showing a portion of an aircraft fuselage with a pressure bulkhead assembly according to an exemplary embodiment of the invention installed therein, the fuselage having parts broken away for the purpose of illustration.
Figure 1B:
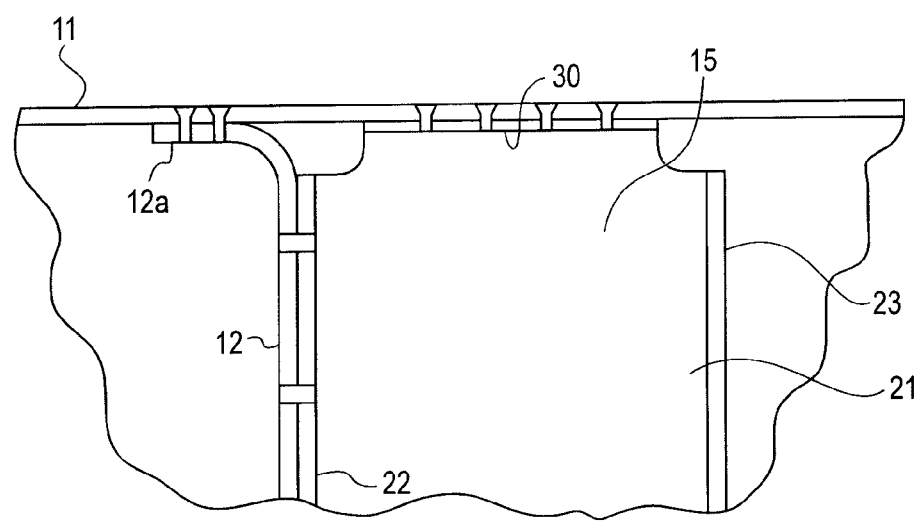
FIG. 1B is a cross-sectional view illustrating a portion of a pressure bulkhead assembly according to an exemplary embodiment of the invention in which the bulkhead web and primary beam member are attached to the fuselage.

Referring more particularly to the drawings and initially to FIGS. 1A-1B, there is shown a pressure bulkhead assembly 10 embodying the invention and adapted to be attached to the inner wall surface of the fuselage skin 11 of an aircraft. The particular fuselage shown has a circular cross section, but could be oval or any other suitable shape. The fuselage skin 11 forms part of the cabin or cockpit compartment of the aircraft, the cabin or cockpit compartment being adapted for pressurization. The illustrated bulkhead assembly 10 may form the aft wall of the pressurized compartment. It is appreciated that the bulkhead assembly 10 is used to separate a pressurized compartment, such as the cabin compartment, from a non-pressurized region or compartment, and may be used in other places in the aircraft, such as a forward bulkhead or the like.

The bulkhead assembly 10 includes a relatively thin bulkhead web or skin 12 and a reinforcing structure 13. The reinforcing structure 13 includes a plurality of beams 15, 16, and a series of connecting strips 35. The bulkhead web 12 has a circular shape corresponding to the cross section of the fuselage skin 11, and has a first surface facing toward the pressurized compartment, and a second surface opposite the first surface. A peripheral portion of the bulkhead web 12 defines a rim 12a that faces toward the pressurized compartment and is attached to an inner surface of the fuselage skin 11 so as to attach the bulkhead in place and seal the pressurized compartment against pressure leaks. As is known to those skilled in the art, the bulkhead web rim 12a may be attached to the fuselage inner wall by adhesive bonding and/or mechanical fasteners.

The reinforcing structure 13 is attached to the second surface of the bulkhead web 12 and provides sufficient strength and stiffness to help the bulkhead web 12 resist deformation due to the pressurized load. Both the bulkhead web 12 and the reinforcing structure 13 might be formed from suitable fiber reinforced composite materials. The reinforcing structure 13 may be attached to the bulkhead web 12 by adhesive bonding and/or mechanical fasteners, as is well known in the art.

The depicted reinforcing structure 13 includes a series of primary beam members 15, a series of secondary beam members 16, and a series of connecting elements or strips 35. The primary beam members 15 are preferably arranged substantially parallel to one another and extend across the fuselage skin 11 from edge to edge, as shown in FIG. 1A. The primary beam members 15 have an I-shaped cross-section, and include a beam web 21 interconnecting a first flange 22 and a second flange 23. (See FIGS. 1B, 2A, 2B, and 4). The first flange 22 is disposed adjacent to the bulkhead web 12, and is preferably attached to the bulkhead web second surface by adhesive bonding and/or mechanical fasteners. The distance between the flanges 22, 23 should be as small as possible but yet sufficient to provide adequate beam strength.

Figure 2A:
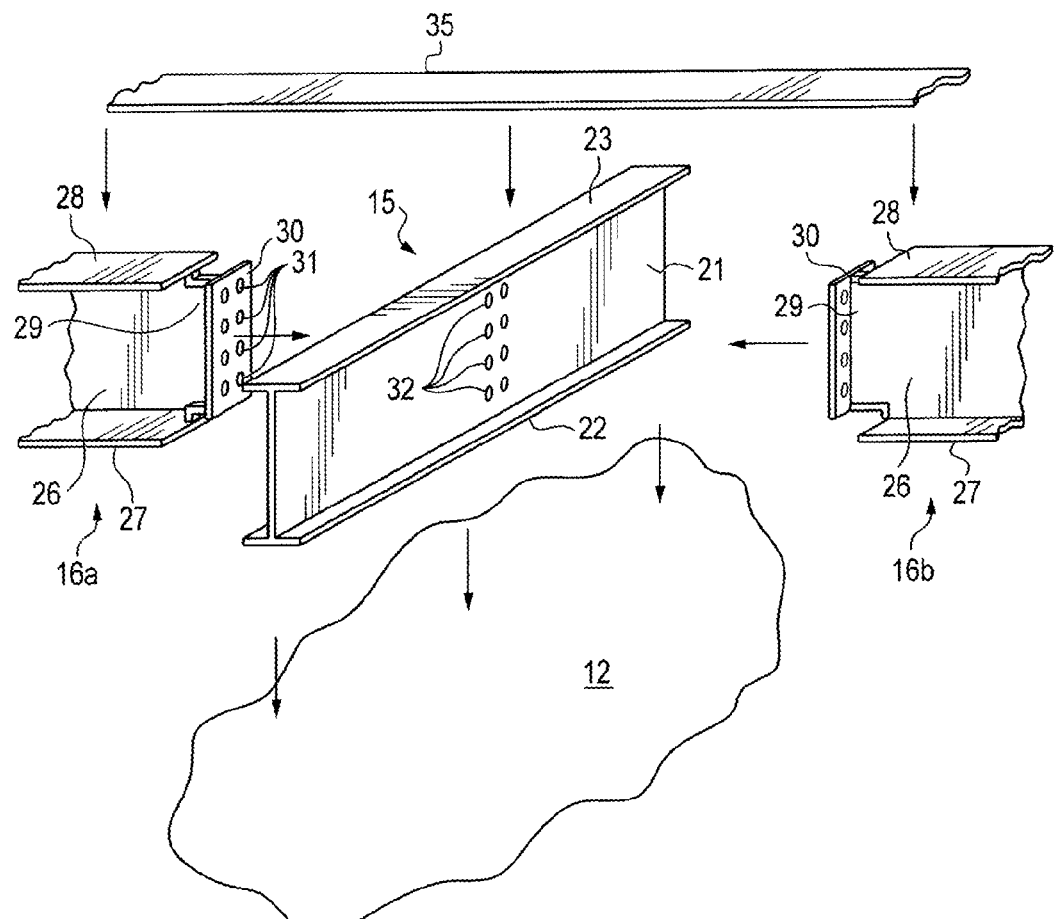
FIG. 2A is a fragmentary exploded perspective view showing a portion of a reinforcing structure of the pressure bulkhead assembly of FIG. 1A and illustrating the relationship between the primary beam member, inner and outer secondary beam members, and a connecting strip, prior to assembly.
Figure 2B:
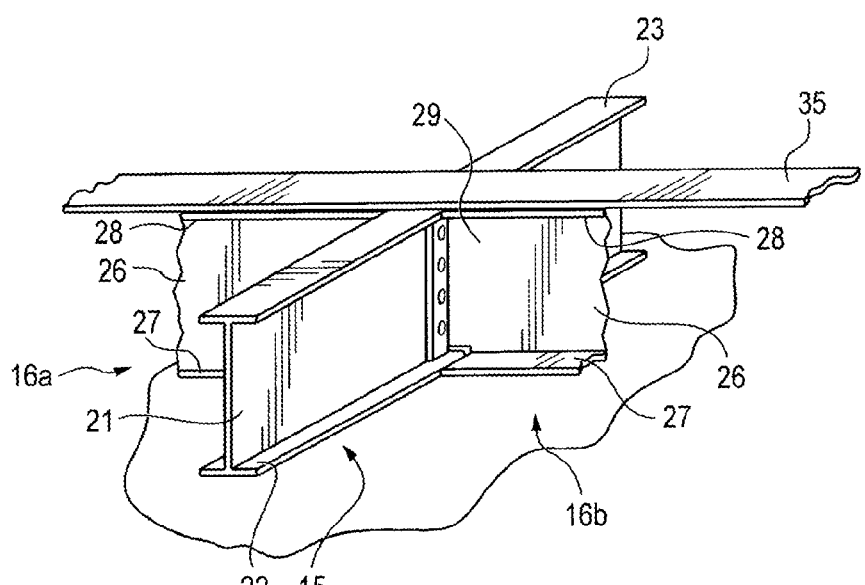
FIG. 2B is similar to FIG. 2A, but illustrates the reinforcing structure in an assembled condition.

Each of the secondary beam members 16 is discontinuous, and is defined by at least one inner secondary beam member 16a and at least two outer secondary beam members 16b. The inner and outer secondary beam members 16a, 16b are substantially aligned with one another and are each connected to at least one primary beam member 15. More specifically, the inner secondary beam members 16a extend between, and are attached to, adjacent primary beam members 15. The outer secondary beam members 16b extend between, and are attached to, the fuselage skin 11 and one of the primary beam members 15. The inner and outer secondary beam members 16a, 16b also may have an I-shaped cross section defining a beam web 26, a first flange 27, and a second flange 28, as shown in FIGS. 2A-2B.

Figure 4:
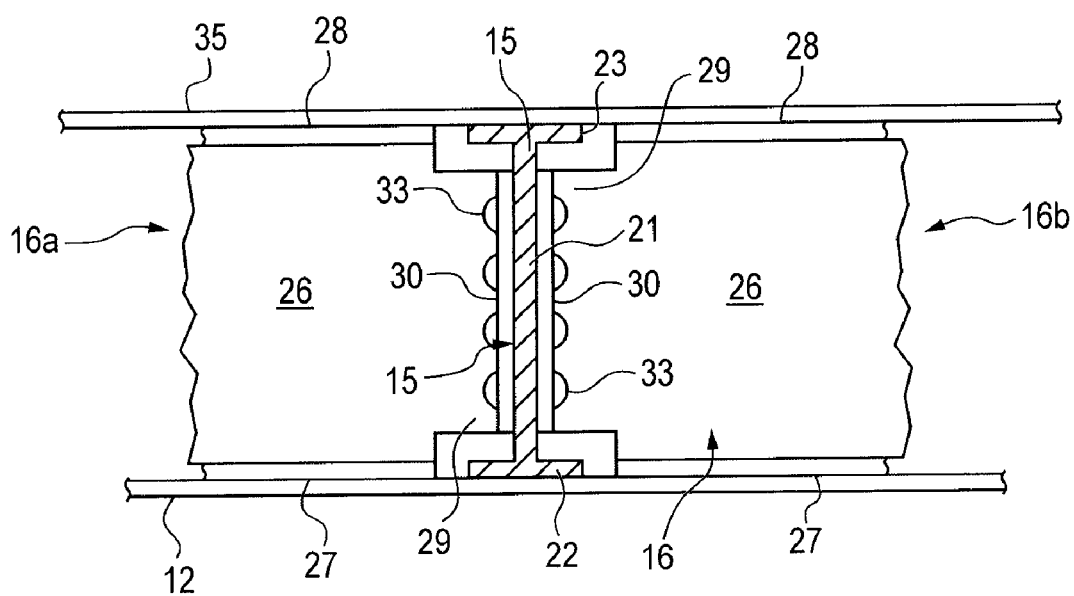
FIG. 4 is a sectional view taken on the line 4-4 of FIG. 3.

The beam web 26 of each inner beam members 16a has end portions 29 that extend outwardly past the ends of the first and second flanges 27, 28. The end portions 29 have a bracket 30 formed thereon. Each bracket 30 extends in a direction transverse to the direction of the end portions 29, and is attached to the primary beam web 21. More specifically, each bracket 30 has series of holes 31 formed therein that match corresponding holes 32 in the primary beam web 21, as shown in FIGS. 2A, 2B, and 4. Thus, mechanical fasteners 33 may be inserted through the holes 31 in one beam member end portion bracket 30, through the aligned holes 32 in the primary beam member web 21, and through holes 31 in another beam member end portion bracket 30 to attach the components to one another. Lightweight fasteners formed of titanium or corrosion resistant steel (CRES) may be used. Fasteners sold under the name "Hi-Lite" are suitable for this application.

Mounting brackets 30 are provided at each end of the inner and outer secondary beam members 16a, 16b, and at each end of the primary beam member 15. In this regard, it is considered apparent that the outer surface of the mounting bracket 30 on the outer beam member 16a and the primary beam member 15 that attaches to the fuselage skin may be curved to correspond to the inner peripheral shape of the fuselage skin. It is further appreciated that the particular mounting bracket 30 is illustrative of the preferred embodiment currently contemplated, but that the present invention is not limited thereto.

Figure 3:
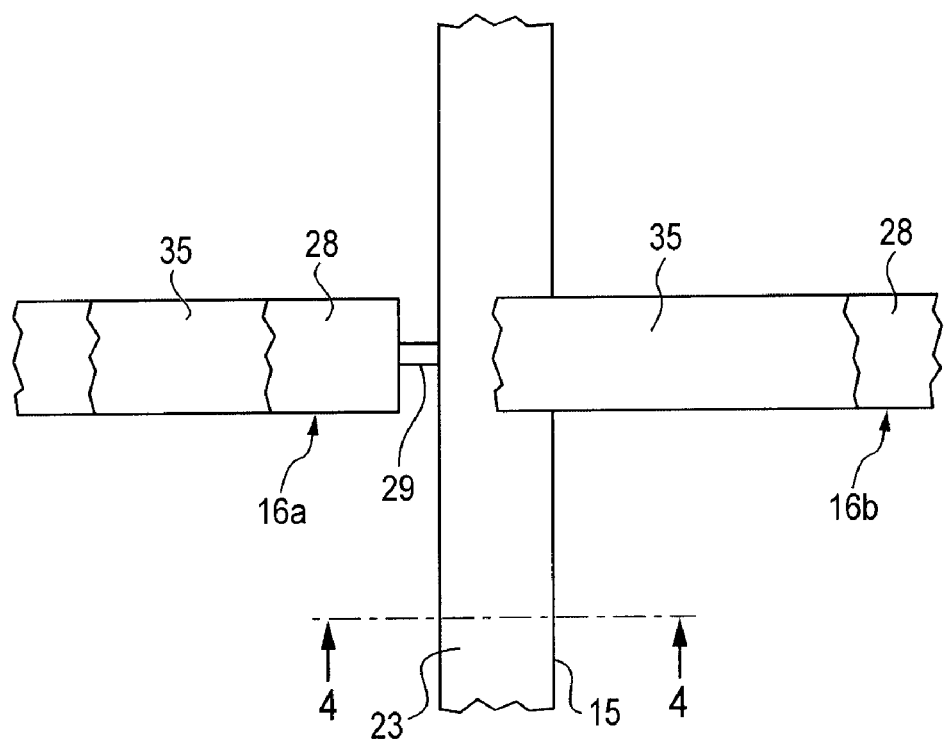
FIG. 3 is a fragmentary plan view showing intersecting primary and secondary stiffening members and a connecting strip of the reinforcing structure of FIG. 2B, all in assembled relationship and with parts broken away for the purpose of illustration.

In order to improve the strength of the reinforcing structure 13 of the bulkhead assembly 10, a connecting element or strip 35 connects aligned ones of the outer and inner secondary beam members 16a, 16b together. Each secondary beam member 16 is defined by a pair of outer secondary beam members 16b and one or more inner secondary beam members 16a that are substantially aligned with one another. The connecting strip 35 is attached to the exposed outer surface of the second flanges 28 of each of the inner and outer secondary beam members 16a, 16b, as shown best in FIGS. 3 and 4. Each connecting strip 35 spans across, but is preferably not attached to, the second flange of the primary beam members 15. The strip 35 serves as a continuous supplemental flange structure along the entire length of each of the secondary beam members 16.

The illustrated strip 35 is preferably flat and is attached to the outer surfaces of the second flanges 28 by adhesive bonding and/or mechanical fasteners. However, it is contemplated that the strip 35 may be L-shaped or U-shaped, and that a pair of such L-shaped strips may be attached over the outer surfaces of the second flanges 28. It is further contemplated that, if the height dimension (i.e., distance from the first flange to the second flange) of the secondary beam members 16 is greater than that of the primary beam members 15, the strips 35 (flat, L-shaped, or U-shaped) could be attached to inner and/or outer surfaces of the secondary beam members second flanges 28.

With the aforementioned structure, the bulkhead assembly 10 has excellent beam strength in both the direction of the primary beam members 15 and the secondary beam members 16. At the same time, the bulkhead assembly 10 has a low height with respect to its dimension along the axis of the fuselage 11. For one particular size of fuselage, the height dimension of the bulkhead assembly 10 is about 100 mm, whereas a conventional bulkhead height for the same size fuselage is about 250 mm. As a result of this invention, more cabin space has been made available.

Figure 5:
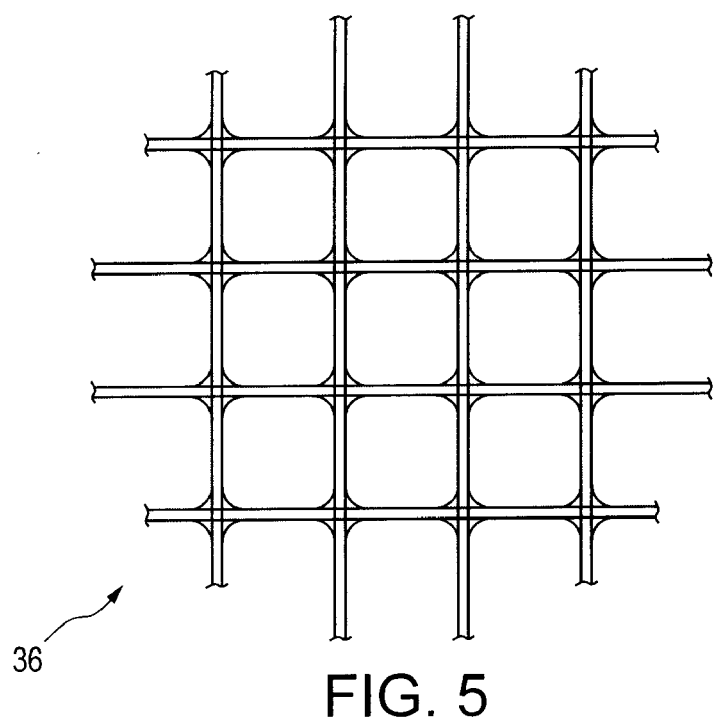
FIG. 5 is a plan view according to another exemplary embodiment showing a connecting member according to another exemplary embodiment of the invention; and, FIG. 6 is a fragmentary top elevation showing a portion of a reinforcing structure incorporating the connecting member of FIG. 5.
Figure 6:
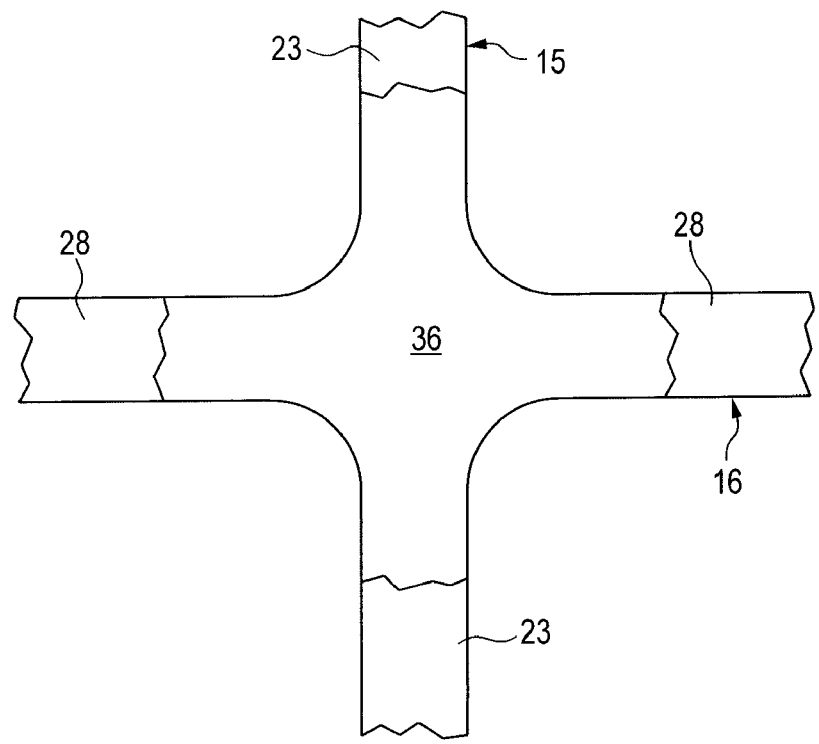

An alternate form of the invention is shown in FIGS. 5 and 6. In this embodiment the connecting strips 35 used in the bulkhead assembly of FIGS. 1A-4 are replaced with a single component. More particularly, this embodiment uses a single flat grid-like plate 36 that corresponds in shape to the pattern defined by the second flanges of the primary and secondary beam members 15, 16. Accordingly, the plate 36 may be attached to the second flanges 23, 28 of the primary beam members 15 and the inner and outer secondary beam members 16a, 16b at the same time to provide a continuous supplemental flange structure. Alternatively, the plate may be attached to only the second flanges 23, 28 of some of the primary and secondary beam members 15, 16. Although access to the interior of the bulkhead assembly 10 from the non-pressurized side is desirable, especially adjacent the fuselage, it is also contemplated that the connecting plate 36 could be continuous and, in this regard, similar to the bulkhead web 12. In such a situation, such a continuous connecting plate could extend all the way to the fuselage, although this is not entirely necessary.

In addition to the bulkhead structure defined above, the invention provides an improved method of assembly. The method is best described with respect to FIG. 2A, which shows the primary components of the bulkhead in an unassembled form.

As a first step, the bulkhead web 12, primary beam members 15, inner and outer secondary beam members 16a, 16b, and the connecting strip 35 are formed in respective molds to produce fiber reinforced composite components. Then, the inner secondary beam members 16a are attached to adjacent primary beam members 15 and the outer secondary beam members 16b are attached to the outermost ones of the primary beam members 15. The secondary beam members mounting portions 30 may be attached to the primary beam member beam webs 21 by mechanical fasteners extending through the aligned openings 31, 32, as described hereinbefore. Thereafter, the connecting strips 35 are attached to the second flanges of the secondary beam members 16 by adhesive bonding and/or mechanical fasteners.

The reinforcing structure 13 is then positioned on the bulkhead web 12 such that the second surface of the bulkhead web is in engagement with the first flanges of the primary and secondary beam members 15, 16. The bulkhead web 12 may be initially attached to the reinforcing structure 13 by deco fasteners, and may be subsequently permanently attached with adhesive bonding (i.e., thermal or heat bonding) and permanent mechanical fasteners (e.g., Hi-Lite fasteners) to form the bulkhead assembly 10.

The bulkhead assembly 10 is then attached to the fuselage skin 11. More specifically, the rim 12a of the bulkhead web 12 may be held in place on the fuselage with fasteners and/or adhesively bonded to the fuselage skin 11. Similarly, mounting flanges at the outer ends of the outer secondary beam members 16b and the free ends of the primary beam members 15 may be attached to the fuselage skin 11 by adhesive bonding and/or mechanical fasteners.

While the invention has been shown and described with respect to a specific embodiment thereof, this is intended for the purpose of illustration rather than limitation and other variations and modifications will be apparent to those skilled in the art, all within the intended spirit and scope of the invention. Accordingly, the patent is not to be limited in scope and effect to the specific device herein shown and described nor in any other way that is inconsistent with the spirit and scope of the invention.

What is claimed is:

1. A bulkhead assembly adapted to be mounted in an aircraft fuselage comprising:
   a relatively flat bulkhead web corresponding to a cross sectional shape of the fuselage, said bulkhead web having a first surface facing a pressurized compartment and a second surface opposite the first surface;
   a reinforcing structure attached to the second surface of the bulkhead web, the reinforcing structure including:
   primary beam members each having a beam web that interconnects a first flange and a second flange, said first flange engaging the second surface of the bulkhead web;
   secondary beam members intersecting the primary beam members, said secondary beam members being formed of discontinuous inner secondary beam members and outer secondary beam members, each of said inner and outer secondary beam members including a beam web that interconnects a first flange and a second flange, said first flange of said inner and outer beam members engaging said bulkhead web second surface; and,
   a plurality of connecting elements attached to the second flanges of said inner secondary beam members and outer secondary beam members, said plurality of connecting elements comprising flat connecting strips that span across the second flange of the primary beam members to provide a continuous supplemental flange structure along the entire length of the secondary beam members.

2. The bulkhead assembly as defined in claim 1, wherein the bulkhead web, beam members, and connecting elements are formed from fiber reinforced composite materials.

3. The bulkhead assembly as defined in claim 2, wherein the bulkhead web, beam members, and connecting elements are adhesively bonded to one another.

4. The bulkhead assembly as defined in claim 1, wherein the primary beam members have first and second ends and at least one primary beam member extends across the fuselage, and wherein the first and second ends of the primary beam members are attached to fuselage skin.

5. The bulkhead assembly as defined in claim 4, wherein the inner secondary beam members extend between, and are attached to, adjacent primary beam members.

6. The bulkhead assembly as defined in claim 4, wherein the outer secondary beam members extend between, and are attached to, fuselage skin and one of the primary beam members.

7. The bulkhead assembly as defined in claim 3, wherein the outer secondary beam members extend between, and are attached to, fuselage skin and one of the primary beam members.

8. The bulkhead assembly as defined in claim 7, wherein the bulkhead web includes a peripheral rim that is attached to the fuselage.

9. The bulkhead assembly as defined in claim 1, wherein the primary beam members have first and second ends and extend across the fuselage, and wherein the first and second ends of the primary beam members are attached to fuselage skin.

10. The bulkhead assembly as defined in claim 9, wherein the inner secondary beam members extend between, and are attached to, adjacent primary beam members.

11. The bulkhead assembly as defined in claim 10, wherein the outer secondary beam members extend between, and are attached to, fuselage skin and one of the primary beam members.

12. The bulkhead assembly as defined in claim 1, wherein said plurality of connecting elements comprising flat connecting strips are included in a grid-like plate.

13. The bulkhead assembly as defined in claim 1, wherein each of the primary and secondary beam members have an I-shaped cross section.

14. The bulkhead assembly as defined in claim 1, wherein said flat connecting strips that span across the second flange of the primary beam members are not attached to the second flange of said primary beam members.

* * * * *